US012782975B2

(12) United States Patent
Ahmad et al.

(10) Patent No.: US 12,782,975 B2
(45) Date of Patent: Nov. 3, 2026

(54) ADAPTIVE RESPONSE FOR MARSHALING FAILURE MODES

(71) Applicant: Ford Global Technologies, LLC, Dearborn, MI (US)

(72) Inventors: Syed Amaar Ahmad, Canton, MI (US); Krishna Bandi, Novi, MI (US); Eduardo Perez Guzman, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 18/523,342

(22) Filed: Nov. 29, 2023

(65) Prior Publication Data

US 2025/0172954 A1 May 29, 2025

(51) Int. Cl.

| | |
|---|---|
| ***G05D 1/80*** | (2024.01) |
| ***G05D 1/633*** | (2024.01) |
| ***G05D 1/65*** | (2024.01) |
| ***G05D 1/693*** | (2024.01) |
| ***G05D 1/695*** | (2024.01) |
| ***H04W 4/44*** | (2018.01) |
| *G05D 109/10* | (2024.01) |
| *G05D 111/30* | (2024.01) |

(52) U.S. Cl.

CPC ............... *G05D 1/80* (2024.01); *G05D 1/633* (2024.01); *G05D 1/65* (2024.01); *G05D 1/693* (2024.01); *G05D 1/695* (2024.01); *H04W 4/44* (2018.02); *G05D 2109/10* (2024.01); *G05D 2111/32* (2024.01)

(58) Field of Classification Search

None

See application file for complete search history.

(56) References Cited

U.S. PATENT DOCUMENTS

| | | | | |
|---|---|---|---|---|
| 8,983,759 | B2 | 3/2015 | Smith et al. | |
| 9,928,746 | B1 | 3/2018 | Macneille et al. | |
| 2010/0256836 | A1 | 10/2010 | Mudalige | |
| 2011/0148610 | A1* | 6/2011 | Snider | B60R 25/00 340/426.22 |
| 2013/0131949 | A1* | 5/2013 | Shida | B60K 31/00 701/96 |
| 2014/0136414 | A1* | 5/2014 | Abhyanker | G06Q 20/3224 701/25 |
| 2015/0269845 | A1 | 9/2015 | Calmettes et al. | |
| 2017/0337813 | A1 | 11/2017 | Taylor | |
| 2018/0345907 | A1* | 12/2018 | Tamane | B60R 25/209 |
| 2019/0056733 | A1* | 2/2019 | Ferguson | B60W 60/001 |

(Continued)

FOREIGN PATENT DOCUMENTS

| | | | |
|---|---|---|---|
| CN | 109587283 | | 4/2019 |
| JP | 2023104253 | A * | 7/2023 |

*Primary Examiner* — Davin Seol

(74) *Attorney, Agent, or Firm* — Burris Law, PLLC

(57) ABSTRACT

A method of broadcasting a signal to marshal a plurality of autonomously operated vehicles including the signal broadcasted to the plurality of autonomously operated vehicles, the establishment of a secure data connection with each of the plurality of autonomously operated vehicles based on the signal, the determination of a disruption in the secure data connection to one or more vehicles of the plurality of autonomously operated vehicles, and the causation of the one or more vehicles of the plurality of autonomously operated vehicles to initiate an action based on the disruption in the secure data connection.

20 Claims, 9 Drawing Sheets

(56) References Cited

U.S. PATENT DOCUMENTS

| | | | | |
|---|---|---|---|---|
| 2019/0141467 | A1 | 5/2019 | Breed | |
| 2019/0215670 | A1 | 7/2019 | Ameixieira | |
| 2020/0057453 | A1 | 2/2020 | Laws et al. | |
| 2020/0077278 | A1 | 3/2020 | Jornod et al. | |
| 2020/0267519 | A1* | 8/2020 | Reimann | H04B 17/373 |
| 2020/0410868 | A1 | 12/2020 | Bouillon et al. | |
| 2021/0086757 | A1* | 3/2021 | Sugano | B60W 30/06 |
| 2021/0225092 | A1* | 7/2021 | Lei | G07C 5/008 |
| 2021/0328694 | A1 | 10/2021 | Alieiev et al. | |
| 2022/0178705 | A1 | 6/2022 | Tarkiainen et al. | |
| 2022/0289244 | A1* | 9/2022 | Wang | B60W 60/0027 |
| 2022/0348223 | A1* | 11/2022 | Zhao | B60W 40/02 |
| 2023/0135207 | A1* | 5/2023 | Schuh | G06V 20/56<br>342/70 |
| 2023/0145508 | A1 | 5/2023 | Kaphengst et al. | |

* cited by examiner

ADAPTIVE RESPONSE FOR MARSHALING FAILURE MODES

FIELD

The present disclosure relates to managing a wireless connection between one or more vehicles and one or more infrastructures. More specifically, the present disclosure relates to one or more adaptive responses the one or more vehicles can initiate based on one or more failure modes related to the wireless connection between the one or more vehicles and the one or more infrastructures.

BACKGROUND

The statements in this section merely provide background information related to the present disclosure and may not constitute prior art.

In a vehicle marshaling environment, automated plant or depot marshaling technology enables vehicles coming to end-of-line in a manufacturing plant or parking facility to be wirelessly controlled and guided to a parking facility through a sensing infrastructure controller that constantly monitors and detects vehicles. The loss of a wireless communication, or of reliable wireless communication, could potentially result in a loss of transmission of communication data packets between the vehicle and the sensing infrastructure controller. The present disclosure addresses these and other issues related to marshaling vehicles.

SUMMARY

This section provides a general summary of the disclosure and is not a comprehensive disclosure of its full scope or all of its features.

The present disclosure provides a method of broadcasting a signal to marshal a plurality of autonomously operated vehicles, the method comprising: broadcasting, to the plurality of autonomously operated vehicles, the signal, wherein the signal is associated with one or more commands that guide the plurality of autonomously operated vehicles to a waypoint; establishing, with each of the plurality of autonomously operated vehicles based on the signal, a secure data connection; determining a disruption in the secure data connection to one or more vehicles of the plurality of autonomously operated vehicles; and causing, based on the disruption in the secure data connection, the one or more vehicles of the plurality of autonomously operated vehicles to initiate an action; wherein at least one of the plurality of autonomously operated vehicles is a host vehicle, wherein the host vehicle implements a collision avoidance algorithm configured to: estimate at least a position and orientation of each of the plurality of autonomously operated vehicles based on one or more vehicle sensors associated with the host vehicle; and determine that the broadcasted signal matches received information, by the host vehicle, associated with the guidance of the autonomously operated vehicles to the waypoint; wherein the host vehicle communicates a potential collision to each of the plurality of autonomously operated vehicles based on sensor data from the one or more vehicle sensors and further based on the received information not matching the broadcasted signal; wherein the disruption in the secure data connection is determined based on one or more of: a loss of one or more data packets between the one or more vehicles and a server; a server sensing error; human takeover of the one or more vehicles and an unscheduled deviation from a planned route based on a minimum displacement that is exceeded for a predetermined interval; malicious control of software associated with the one or more vehicles; or pedestrians or another vehicle within a proximity of a path zone of the one or more vehicles at an unscheduled time; wherein causing the one or more vehicles of the plurality of autonomously operated vehicles to initiate the action further comprises: causing, based on the one or more commands and the disruption in the secure data connection, one or more vehicles of the plurality of autonomously operated vehicles that maintain the secure data connection to decelerate, thereby causing the one or more vehicles that have maintained the secure data connection to increase a safety gap between each of the plurality of autonomously operated vehicles, wherein the one or more vehicles that have maintained the secure data connection are behind the one or more vehicles having the disruption in the secure data connection; further comprising: causing, based on the broadcasted one or more commands and a restoration of the secure data connection, one or more vehicles that maintain the secure data connection to accelerate, thereby causing the one or more vehicles that have maintained the secure data connection to decrease a safety gap between each of the plurality of autonomously operated vehicles, wherein the one or more vehicles that have maintained the secure data connection are behind the one or more vehicles having the disruption in the secure data connection; wherein determining the disruption in the secure data connection further comprises: determining that the disruption in the secure data connection exceeds a threshold of time or a threshold amount of lost data packets that are lost; wherein causing the one or more vehicles of the plurality of autonomously operated vehicles to initiate an action further comprises: causing, based on the disruption in the secure data connection exceeding the threshold of time or the threshold amount of lost data packets, the one or more vehicles to maneuver away from the plurality of autonomously operated vehicles; or causing, based on one or more instructions and the disruption in the secure data connection exceeding the threshold of time or the threshold amount of lost data packets, the one or more vehicles to output an exterior alarm, wherein the exterior alarm is an emitted sound, a pattern of flashing lights, or a combination thereof.

The present disclosure provides a method of individually transmitting a signal to marshal each vehicle of a plurality of autonomously operated vehicles, the method comprising: transmitting, to each of the plurality of autonomously operated vehicles, the signal, wherein the signal is associated with respective vehicles of the plurality of autonomously operated vehicles and one or more commands that guide each of the autonomously operated vehicles to a waypoint; establishing, with each of the plurality of autonomously operated vehicles based on the signal, a secure data connection; determining a disruption in the secure data connection to one or more vehicles of the plurality of autonomously operated vehicles; and transmitting, based on the disruption in the secure data connection to the one or more vehicles of the plurality of autonomously operated vehicles, one or more instructions, wherein the one or more instructions cause the one or more vehicles to initiate an action; wherein the disruption in the secure data connection is determined based on one or more of: a loss of one or more data packets between the one or more vehicles and a server; a server sensing error; human takeover of the one or more vehicles and an unscheduled deviation from a planned route based on a minimum displacement that is exceeded for a predetermined interval; malicious control of software associated with the one or more vehicles; or pedestrians or another vehicle within a proximity of a path zone of the one or more vehicles at an unscheduled time; further comprising: causing, based on the one or more instructions and the disruption in the secure data connection, one or more vehicles that maintain the secure data connection and behind the one or more vehicles having the disruption in the secure data connection to decelerate, thereby causing the one or more vehicles having the maintained secure data connection to increase a safety gap between each of the plurality of autonomously operated vehicles; further comprising: causing, based on the transmitted one or more instructions and a restoration of the secure data connection, one or more vehicles that maintain the secure data connection and behind the one or more vehicles having the disruption in the secure data connection to accelerate, thereby causing the one or more vehicles having maintained secure data connection to decrease a safety gap between each of the plurality of autonomously operated vehicles; wherein determining the disruption in the secure data connection further comprises: determining that the disruption in the secure data connection exceeds a threshold of time or a threshold amount of lost data packets that are lost; further comprising: causing, based on the one or more instructions and the disruption in the secure data connection exceeding the threshold of time or the threshold amount of lost data packets, the one or more vehicles to maneuver away from the plurality of autonomously operated vehicles; or causing, based on the one or more instructions and the disruption in the secure data connection exceeding the threshold of time or the threshold amount of lost data packets, the one or more vehicles to output an exterior alarm, wherein the exterior alarm is an emitted sound, a pattern of flashing lights, or a combination thereof.

The present disclosure provides a system for marshaling a plurality of autonomously operated vehicles, the system comprising: a server configured to: broadcast, to the plurality of autonomously operated vehicles, a signal associated with one or more commands, wherein the one or more commands guide the plurality of autonomously operated vehicles to a waypoint, establish, with each of the plurality of autonomously operated vehicles based on the signal, a secure data connection, determine a disruption in the secure data connection, and cause, based on the disruption in the secure data connection, the one or more vehicles of the plurality of autonomously operated vehicles to initiate an action; and a plurality of autonomously operated vehicles configured to: receive the one or more commands, and initiate an action; wherein the disruption in the secure data connection is determined based on one or more of: a loss of one or more data packets between the one or more vehicles and a server; a server sensing error; human takeover of the one or more vehicles and an unscheduled deviation from a planned route based on a minimum displacement that is exceeded for a predetermined interval; malicious control of software associated with the one or more vehicles; or pedestrians or another vehicle within a proximity of a path zone of the one or more vehicles at an unscheduled time; wherein the server configured to cause the one or more vehicles of the plurality of autonomously operated vehicles to initiate an action is further configured to: cause, based on the one or more commands and the disruption in the secure data connection, one or more vehicles of the plurality of autonomously operated vehicles that maintain the secure data connection and behind the one or more vehicles having the disruption in the secure data connection to decelerate, thereby causing the one or more vehicles having the maintained secure data connection to increase a safety gap between each of the plurality of autonomously operated vehicles; wherein the server configured to cause the one or more vehicles of the plurality of autonomously operated vehicles to initiate an action is further configured to: cause, based on the broadcasted one or more commands and a restoration of the secure data connection, one or more vehicles that maintain the secure data connection and behind the one or more vehicles having the disruption in the secure data connection to accelerate, thereby causing the one or more vehicles having the maintained secure data connection to decrease a safety gap between each of the plurality of autonomously operated vehicles; wherein the server configured to determine the disruption in the secure data connection is further configured to: determine that the disruption in the secure data connection exceeds a threshold of time or a threshold amount of lost data packets that are lost; wherein the server configured to cause the one or more vehicles of the plurality of autonomously operated vehicles to initiate an action is further configured to: cause, based on the disruption in the secure data connection exceeding the threshold of time or the threshold amount of lost data packets, the one or more vehicles to maneuver away from the plurality of autonomously operated vehicles; or cause, based on one or more instructions and the disruption in the secure data connection exceeding the threshold of time or the threshold amount of lost data packets, the one or more vehicles to output an exterior alarm, wherein the exterior alarm is an emitted sound, a pattern of flashing lights, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
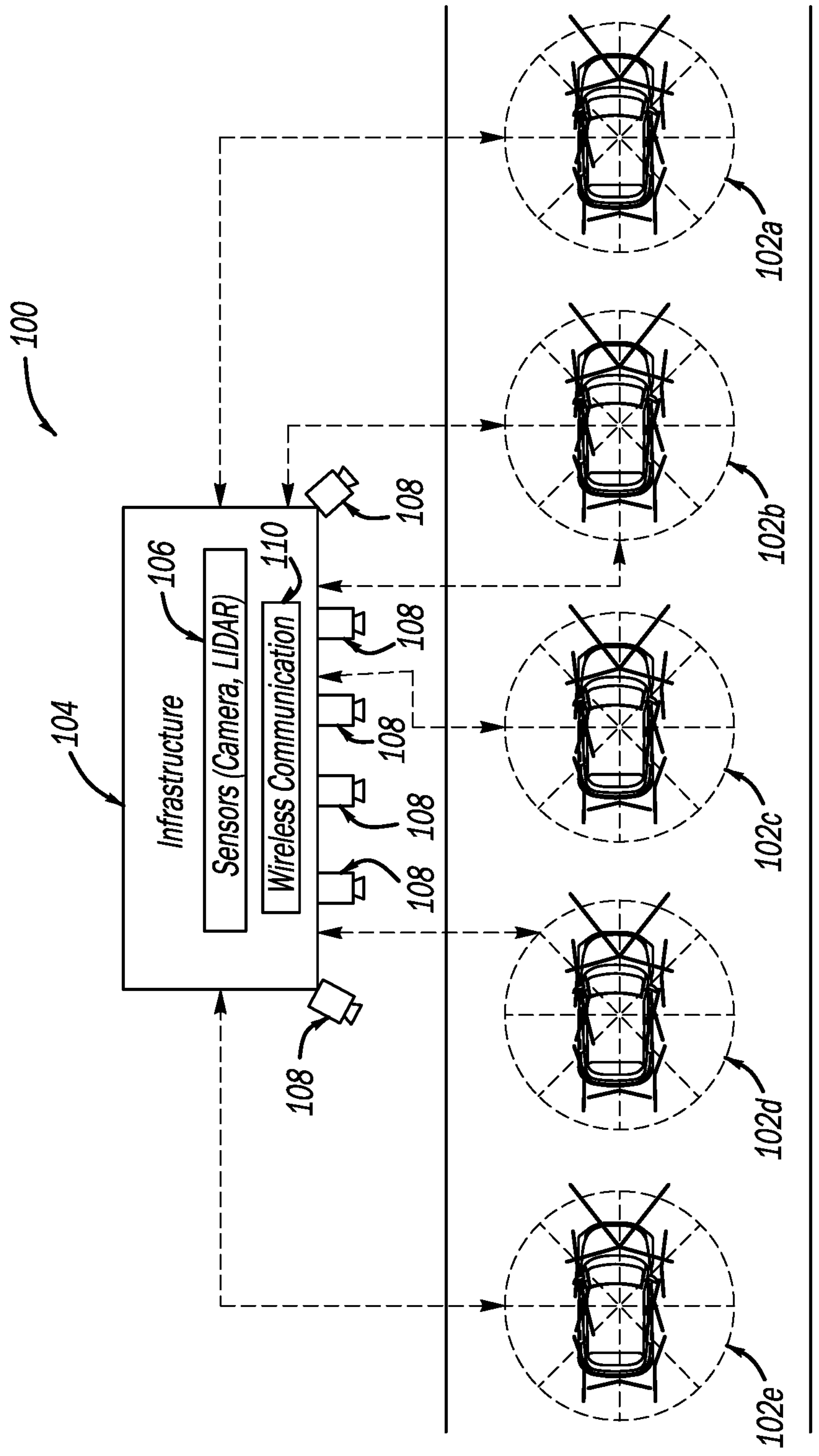
FIG. 1 illustrates a system for distribution of a fleet of vehicles in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a means for an infrastructure to adapt in response to a loss of communication with one or more marshaled vehicles so as to correctly guide the remaining connected marshaled vehicles to a waypoint. The present disclosure additionally provides a means for the one or more marshaled vehicles to provide one or more alerts, such as emit exterior audible alerts, to inform nearby pedestrians of the loss of connectivity as well as to any deviation from a guided route to the original waypoint.

Referring now to FIG. 1, there is shown a system 100 for the distribution of autonomous and semi-autonomous vehicles 102 (e.g., one or more vehicles 102*a*-102*e*) for example, situated in a parking lot and/or factory floor. The system 100 includes an infrastructure server 104. The infrastructure server 104 further includes a sensor component 106 that communicates with a set of infrastructure sensors 108 such as, for example, one or more cameras, lidar, radar, and/or ultrasonic devices. The sensors 108 monitor the movement of the vehicles 102 as the vehicles 102 move through, for example, a factory floor and/or parking lot. The infrastructure server 104 also includes a wireless communication component 110 that provides for communication between the infrastructure server 104 and the vehicles 102, as described in more detail herein.

Figure 2:
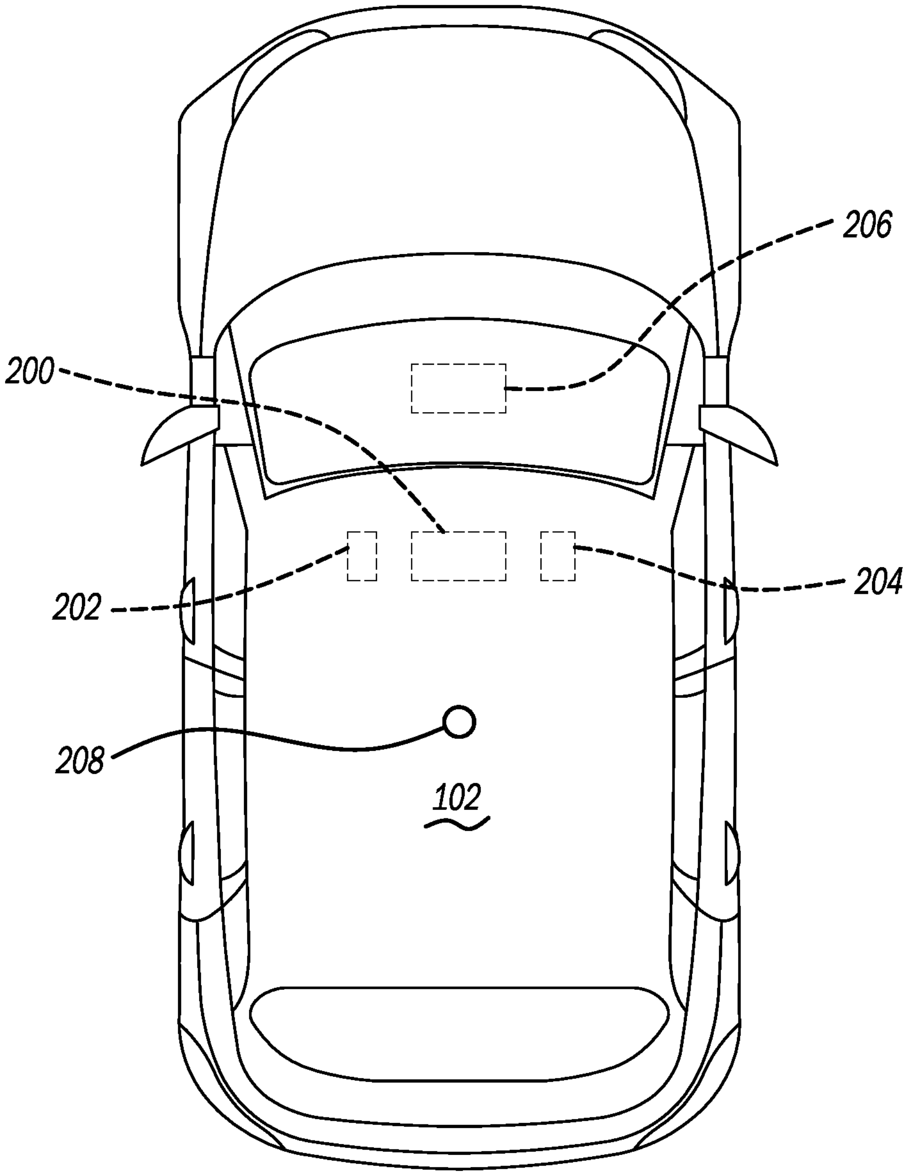
FIG. 2 illustrates an example vehicle distributed by the system shown in FIG. 1 in accordance with various implementations.

Referring further to FIG. 2, in various forms, the vehicles 102 may be powered in a variety of ways, for example, with an electric motor and/or an internal combustion engine. The vehicles 102 may be any type of electrically powered vehicle such as a car, a truck, a robot, a plane and/or a boat, for example. The vehicles 102 include a controller 200, one or more actuators 202, a plurality of on-board sensors 204, and a human machine interface (HMI) 206. The vehicles 102 have a reference point 208, that is, a specified point within the space defined by a vehicle body, for example, a geometrical center point at which respective longitudinal and lateral center axes of the vehicle 102 intersect. The reference point 208 identifies the location of the vehicles 102, for example, a point at which the vehicles 102 are located as the vehicles 102 navigate toward a waypoint.

The controller 200 operates the vehicles 102 in an autonomous or a semi-autonomous mode. The autonomous mode is one in which each of the propulsion, braking, and steering of the vehicles 102 are controlled by the controller 200; in a semi-autonomous mode the controller 200 controls the propulsion, braking, and/or steering of one or two vehicles 102. However, it is understood that the controller 200 may control the propulsion, braking, and/or steering of any number of vehicles 102.

The controller 200, in some examples, is configured or programmed to control the operation of one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the controller 200, as opposed to a human operator, is to control such operations. Additionally, the controller 200 is programmed to determine whether and when a human operator is to control such operations.

The controller 200 includes or may be communicatively coupled to (for example, via a vehicle communications bus) one or more processors, for example, controllers or the like included in the vehicles 102 for monitoring and/or controlling various vehicle controllers, such as a powertrain controller, a brake controller, a steering controller, etc. The controller 200 is generally arranged for communications on a vehicle communication network that can include a bus in the vehicle 102 such as a controller area network (CAN) or the like, and/or other wired and/or wireless mechanisms.

Via a vehicle network, the controller 200 transmits messages to various devices in the vehicles 102 and/or receives messages from the various devices, for example, the one or more actuators 202, the HMI 206, etc. Alternatively, or additionally, in cases where the controller 200 includes multiple devices, the vehicle communication network is utilized for communications between devices represented as the controller 200 in this disclosure. Further, as discussed below, various other controllers and/or sensors provide data to the controller 200 via the vehicle communication network.

In addition, the controller 200 is configured for communicating through a wireless vehicular communication interface with other traffic objects (for example, vehicles, infrastructures, pedestrians, etc.), such as via a vehicle-to-vehicle communication network. The controller 200 is also configured for communicating through a vehicle-to-infrastructure communication network, such as communicating with the wireless communication component 110 of the infrastructure server 104. The vehicular communication network represents one or more mechanisms by which the controller 200 of the vehicles 102 communicate with other traffic objects, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The vehicle actuators 202 are implemented via circuits, chips, or other electronic and/or mechanical components that can actuate various vehicle subsystems in accordance with appropriate control signals. The actuators 202 may be used to control braking, acceleration, and/or steering of the vehicles 102. The controller 200 can be programmed to actuate the vehicle actuators 202 including propulsion, steering, and/or braking based on the planned acceleration or deceleration of the vehicles 102.

The sensors 204 include a variety of devices to provide data to the controller 200. For example, the sensors 204 may include object detection sensors such as lidar sensor(s) disposed on or in the vehicles 102 that provide relative locations, sizes, and shapes of one or more targets surrounding the vehicles 102, for example, additional vehicles, bicycles, pedestrians, robots, drones, etc., travelling next to, ahead, and/or behind the vehicle 102. As another example, one or more of the sensors can be radar sensors fixed to one or more bumpers of the vehicles 102 that may provide locations of the target(s) relative to the location of each of the vehicles 102.

The object detection sensors may include a camera sensor, for example, to provide a front view, side view, rear view, etc., providing images from an area surrounding the vehicles 102. For example, the controller 200 may be programmed to receive image data from a camera sensor(s) and to implement image processing techniques to detect a road, infrastructure elements, etc. The controller 200 may be further programmed to determine a current vehicle location based on location coordinates, for example, GPS coordinates, received from the vehicles 102 and indicative of a location of the vehicles 102 from a GPS sensor.

The HMI 212 is configured to receive information from a user, such as a human operator, during operation of the vehicles 102. Moreover, the HMI 212 is configured to present information to the user, such as, an occupant of one or more of the vehicles 102. In some variations, the controller 200 is programmed to receive destination data, for example, location coordinates, from the HMI 212.

Accordingly, the vehicles 102 can be autonomously guided toward a waypoint using a combination of the infrastructure sensors 108 and the vehicle sensors (e.g., the onboard sensors 204). Routing can be done using vehicle location, distance to travel, queue in line for vehicle marshaling, etc. Vehicles 102 requiring additional charge/fuel can be prepped ahead of joining the queue. Other vehicles 102 destined to a particular waypoint operate in the same way, so that movement of an entire fleet can be coordinated. The movements of the entire fleet coordinate through a central fleet-management system that directs all traffic and logistics from an assembly plant to the waypoint. For example, the entire fleet can be organized in a pre-sorted order.

The centralized fleet-management application, in various examples, has complete knowledge of the vehicles 102 in its control (for example, current location, destination, special notes, etc.), which adds accountability and traceability to the distribution process. The fleet-management is coordinated both within and across sites to optimize delivery timing of each vehicle 102 to the waypoint. A number of logistics applications can be used, which may involve a combination of an infrastructure sensing system integrated with a traffic-management algorithm to queue and deconflict vehicles in real-time. Accordingly, the fleet-management application queues vehicles 102 based on unique characteristics (e.g., how far does the vehicle 102 need to travel, what traffic is along the route, when does the vehicle 102 need to get there to line up in the correct order, etc.).

In an embodiment, the vehicle 102*c* can be a host vehicle while each of the remaining vehicles of the one or more vehicles 102*a*, 102*b*, and 102*d* can be remote vehicles. It is understood that there may be any number of remote vehicles. An infrastructure node (not shown) can utilize the infrastructure sensors 108 to sense and/or provide marshaling cartesian waypoint position information to each of the vehicles 102, including the host vehicle 102*c* and each of the remaining vehicles of the one or more vehicles 102*a*, 102*b*, and 102*d*. For example, the host vehicle 102*c* receives location information associated with the waypoint. The host vehicle 102*c* also monitors each of the remaining vehicles of the one or more vehicles 102*a*, 102*b*, and 102*d* location information. As another example, the host vehicle 102*c* includes a collision avoidance algorithm that utilizes the sensors of the vehicle 102*c* (e.g., the object detection sensors) to estimate relative positions of the remaining vehicles 102*a*, 102*b*, and 102*d*.

The relative positions of the remaining vehicles 102*a*, 102*b*, and 102*d* allow for the collision avoidance algorithm to determine the positions of the remaining vehicles 102*a*, 102*b*, and 102*d* relative to the origin waypoint and any assisted waypoints received from the infrastructure server 104. For example, the host vehicle 102*c* can verify that the waypoint information received for the surrounding vehicles (e.g., the vehicles 102*a*, 102*b*, and 102*d*) match the waypoint information sent by the infrastructure server 104. As another example, the host vehicle 102*c* can verify that the waypoint information received for the surrounding vehicles (e.g., the vehicles 102*a*, 102*b*, and 102*d*) match any estimations and/or calculations made by the host vehicle 102*c* associated with the waypoint.

Additionally, the host vehicle 102*c* can dynamically estimate any threat of a collision based on the information received from one or more sensors of the host vehicle 102*c*. For example, the host vehicle 102*c* can dynamically estimate any threat of a collision based on whether the waypoint information received for the surrounding vehicles (e.g., the vehicles 102*a*, 102*b*, and 102*d*) match any estimations and/or calculations made by the host vehicle 102*c* associated with the waypoint and/or whether the waypoint information received for the surrounding vehicles (e.g., the vehicles 102*a*, 102*b*, and 102*d*) match the waypoint information sent by the infrastructure server 104. As another example, the host vehicle 102*c* can alert any human operators (e.g., the human operators 302) and/or the surrounding vehicles (e.g., the vehicles 102*a*, 102*b*, and 102*d*) of a potential collision. For example, the alert can be provided via a variety of means such as, but not limited to, an audible honk or any other audible notice or visible notice, such as flashing of any exterior lights of the vehicles 102. As another example, the potential collision may be indicated by a mismatch of the waypoint information received for the surrounding vehicles (e.g., the vehicles 102*a*, 102*b*, and 102*d*) or the waypoint information sent by the infrastructure server 104. As an additional example, the collision avoidance algorithm is programmed to track braking events of each of the surrounding vehicles (e.g., the vehicles 102*a*, 102*b*, and 102*d*) associated with the host vehicle 102*c* for safe maneuvering of the vehicles 102.

Figure 3:
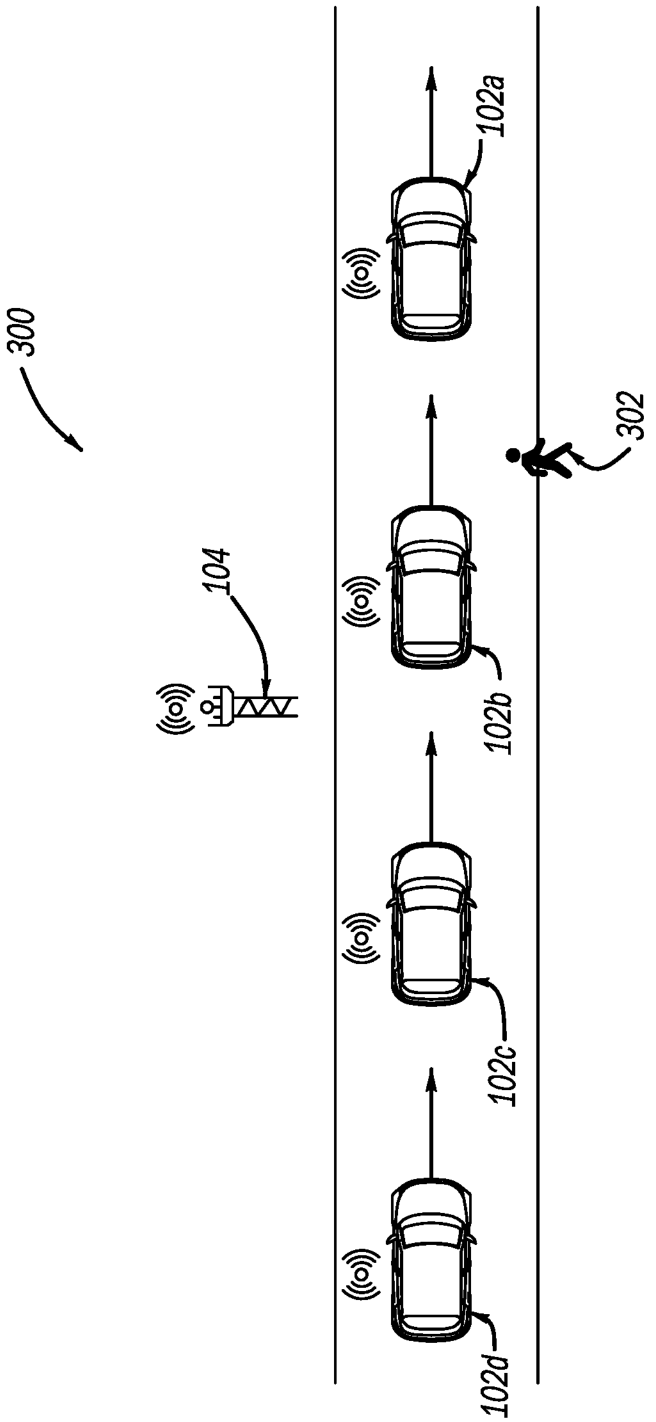
FIG. 3 illustrates an example system for marshaling one or more vehicles in accordance with various implementations.

FIG. 3 illustrates the marshaling of the vehicles 102 as the vehicles 102 are wirelessly connected to the infrastructure server 104 in a guided route 300. The sensor component 106 of the infrastructure server 104 detects and/or tracks each of the vehicles 102. The sensor component 106 of the infrastructure server 104 also detects and/or tracks any pedestrians adjacent to any of the vehicles 102. For example, the sensor component 106 of the infrastructure server 104 detects and/or tracks each of the vehicles 102 and/or any pedestrians (e.g., the human operators 302) adjacent to any of the vehicles 102. As each of the vehicles 102 are wirelessly connected to the infrastructure server 104, the infrastructure server 104 guides each of the vehicles 102 toward the waypoint. For example, the infrastructure server 104 continues to guide each of the vehicles 102 toward the waypoint as long as the vehicles 102 remain connected to the infrastructure server 104. As another example, the infrastructure server 104 guides each of the vehicles 102 toward the waypoint at a target speed. It is understood that the target speed may be any speed. In the instance wherein the vehicles 102 are fully autonomous, the vehicles 102 may obey any commands received from the infrastructure server 104 and move along the path assigned to the vehicles 102 at a constant speed and a constant distance gap as the vehicles 102 are guided toward the waypoint.

Figure 4:
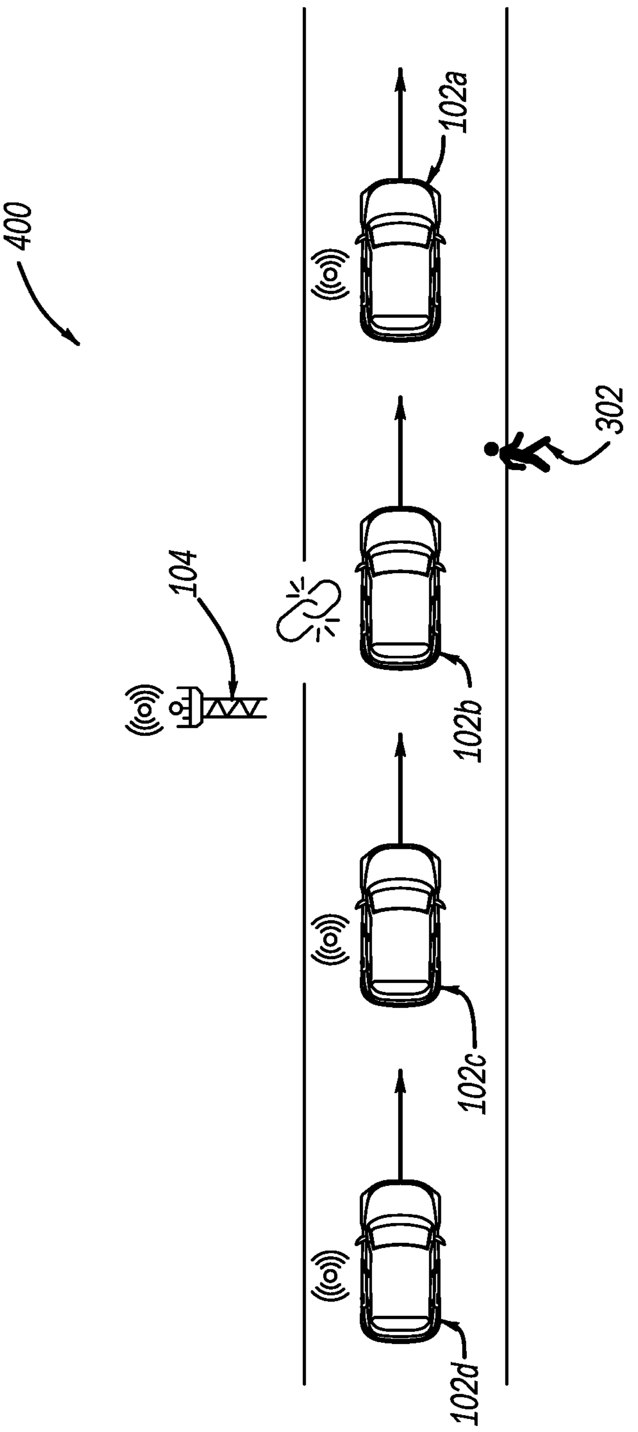
FIG. 4 illustrates a present error within an example system for marshaling one or more vehicles in accordance with various implementations.

FIG. 4 illustrates the marshaling of the vehicles 102 in an instance wherein at least one of the vehicles 102 presents a response associated with the wireless connection between the vehicles 102 and the infrastructure server 104 as the vehicles 102 follow a guided route 400. For example, packets are sent from the infrastructure server 104 to the vehicles 102 via plant control infrastructure messages (PCIMs). In the instance wherein packets sent to the vehicle 102*b* are lost multiple times in a row so that the PCIMs exceed a threshold, the vehicle 102*b* begins to slow down relative to the constant speed at which the vehicle 102*b* was traveling. For example, any of the vehicles (e.g., 102*a*, 102*c*, and/or 102*d*) may lose packets multiple times in a row so that the PCIMs exceed a threshold, in which case the affected vehicle begins to slow down relative to the constant speed the surrounding vehicles were traveling at.

As another example, the vehicle 102*b* (i.e., or any other affected vehicles) may slow down to a stop in the instance wherein packets sent to the vehicle 102*b* are lost multiple times in a row, such that that the PCIMs exceed a threshold. If one or more signals received by the vehicles 102 from the infrastructure server are broadcasted (e.g., C-V2X PC5 broadcast), then vehicles 102*c* and 102*d* can simultaneously detect the instance wherein the loss of PCIMs exceeds the threshold and begin to slow down. For example, the vehicles 102*c* and 102*d* slow down and travel at the reduced speed until vehicle 102*b* is reconnected to the infrastructure server 104. If one or more signals received by the vehicles 102 from the infrastructure server 104 are cellularly sent to each of the vehicles, for example unicasted, the infrastructure server 104 can detect the instance wherein the loss of PCIMs sent to the vehicle 102*b* exceeds the threshold via the infrastructure sensors 108. For example, in the instance wherein the infrastructure server 104 cellularly sends the one or more signals to the vehicles 102, the infrastructure server 104 can adjust corresponding commands (e.g., the one or more signals) sent to the vehicles 102*c* and 102*d* so that the vehicles 102*c* and 102*d* are caused to adapt or adjust one or more maneuvers to slow down. For example, the vehicles 102*c* and 102*d* slow down and travel at the reduced speed until vehicle 102*b* is reconnected to the infrastructure server 104. It is understood that the vehicles (e.g., the vehicle 102*a*) that are upstream from the affected vehicles (e.g., the vehicle 102*b*) continue progressing toward the waypoint.

Figure 5:
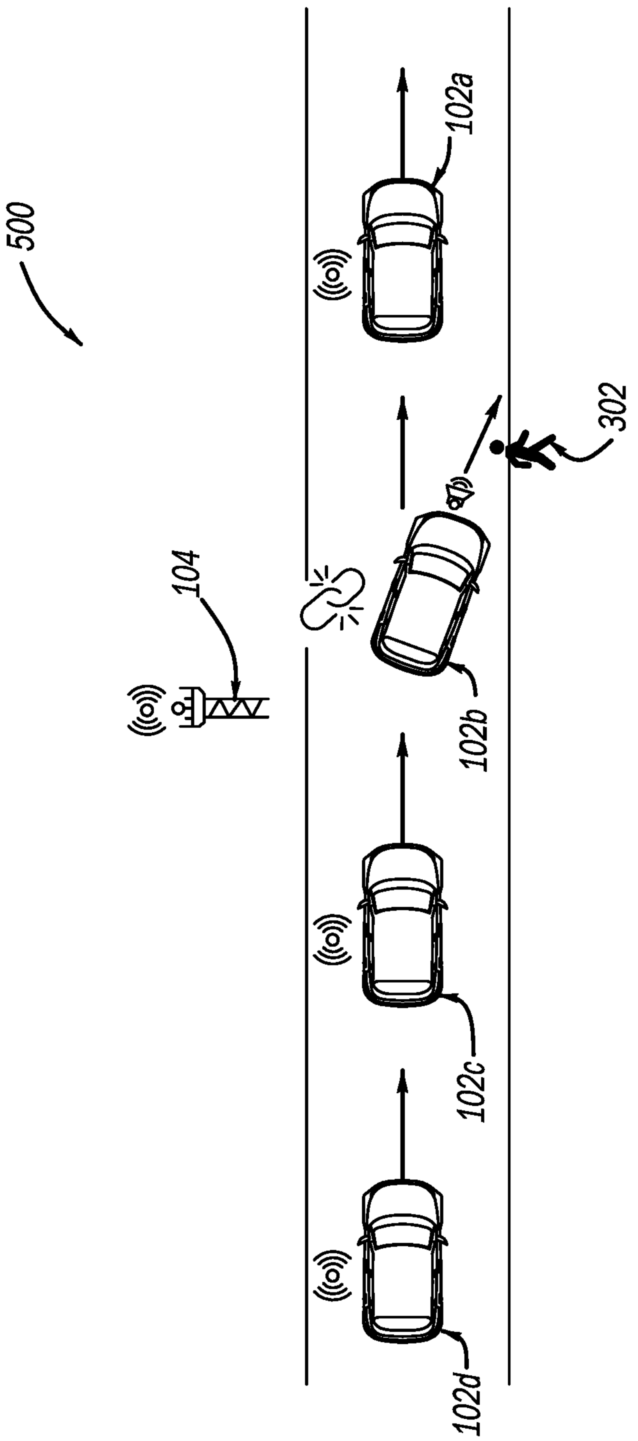
FIG. 5 illustrates a resolution of the present error of FIG. 4.

FIG. 5 illustrates an instance wherein a time that the vehicle 102*b* remains disconnected from the infrastructure server 104 exceeds a threshold in a guided route 500. For example, in the instance wherein the time the vehicle 102*b* remains disconnected from the infrastructure server 104 exceeds the threshold, the vehicle 102*b* may maneuver away from the fleet of marshaled vehicles 102. As another example, the vehicle 102*b* may maneuver away from the fleet of marshaled vehicles 102 to avoid obstruction of the flow of marshaled traffic of the vehicles 102. For example, one or more panel excitors associated with the vehicle 102*b* issues an audio alert indicating a disconnection between the vehicle 102*b* and the infrastructure server 104. It is understood that each of the vehicles 102*a*, 102*c*, and 102*d* include one or more panel excitors also. The one or more panel excitors associated with the vehicle 102*b* also issues an audio alert indicating a reconnection between the vehicle 102*b* and the infrastructure server 104 in some examples. It is understood that the one or more panel excitors associated with the vehicle 102*b* may also issue an audio alert regarding any indication of the connectivity status of the vehicle 102*b* at any time.

In an embodiment, the human operator can take over control of any of the autonomous vehicles 102. For example, the human operator can take over control of any of the autonomous vehicles 102 regardless of the connectivity status of the vehicles 102 and the infrastructure server 104. As another example, the human operator can take over control of any of the autonomous vehicles 102 whether the vehicle 102 is disconnected to the infrastructure server 104 or connected to the infrastructure server 104. The instance wherein the human operator takes over any of the autonomous vehicles 102 is detected by one or more of a CAN signal associated with the opening or closing of a door of the vehicle 102 or a deviation from a location and/or speed assigned to the vehicle 102 by the infrastructure server 104 over a minimum interval (e.g., more than 3 m offset for at least 5 seconds). It is understood, however, that the instance wherein the human operator takes over any of the autonomous vehicles 102 may be detected in any way.

For example, the vehicle (e.g., the vehicle 102*b*) that has deviated from an assigned path for a time that exceeds a threshold may be removed from the marshaled fleet of vehicles 102. As another example, the vehicle (e.g., the vehicle 102*b*) that has deviated from an assigned path for a time that exceeds a threshold may be removed from the marshaled fleet of vehicles 102 and PCIMs are adjusted for the remaining marshaled vehicles (e.g., the vehicles 102*a*, 102*c*, and 102*d*).

As an additional example, the marshaled vehicle (e.g., the vehicle 102*b*) that has control taken over by the human operator can begin to stop its plant control vehicle messages (PCVMs). The PCVMs that are stopped may resume when, for example, the human operator leaves the vehicle 102*b*. As another example, in the instance wherein human takeover of the control of the marshaled vehicle (e.g., the vehicle 102*b*) is detected, the infrastructure server 104 can begin to adjust the marshaled vehicle 102 topology and readjust the path and/or speeds of the marshaled vehicles 102. For example, in the instance wherein human takeover of the control of the marshaled vehicle (e.g., the vehicle 102*b*) is detected, the infrastructure server 104 can begin to adjust the marshaled vehicle 102 topology and readjust the path and/or speeds of the marshaled vehicles 102 through adapting PCIMs.

As another example, in the instance wherein the human operator leaves the vehicle 102*b*, the infrastructure server 104 can re-onboard the vehicle 102*b* into the marshaled topology. In an embodiment, if any of the marshaled vehicles 102 include any type of sensor, the marshaled vehicles 102 can detect an obstruction that may appear along the path assigned to the vehicles 102 by the infrastructure server 104. For example, the sensor may utilize technology such as, but not limited to ultrasonics and/or electromagnetics. As another example, if any of the marshaled vehicles 102 detect an obstruction that may appear along the path assigned to the vehicles 102 by the infrastructure server 104, then the vehicle 102 can come to a stop, cease PCVM transmission, and/or issue audio alerts associated with the obstruction. As an additional example, any of the marshaled vehicles 102 can detect an obstruction that may appear along the path assigned to the vehicles 102 by the infrastructure server 104 based on an unexpected localization error.

Figure 6:
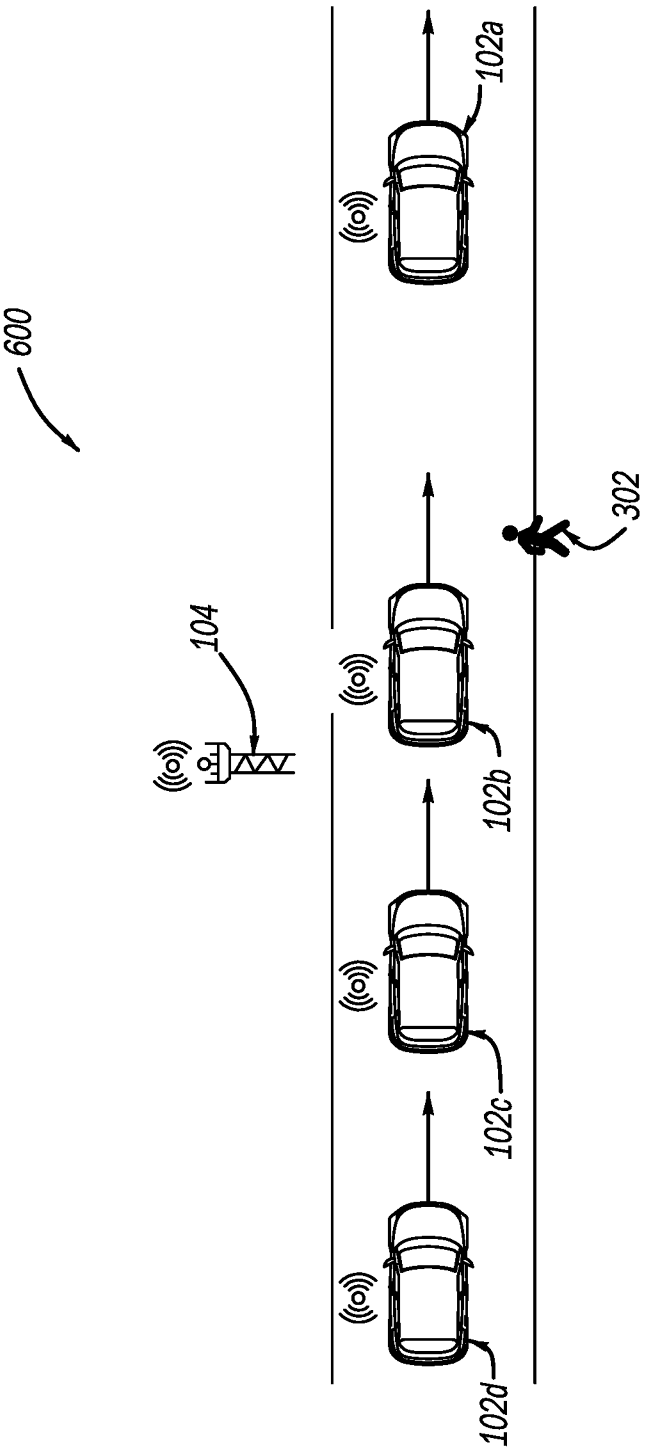
FIG. 6 illustrates another present error within an example system for marshaling one or more vehicles in accordance with various implementations.

FIG. 6 illustrates an instance wherein the vehicle 102*b* is reconnected to the infrastructure 104 in a guided route 600. For example, in the instance wherein the vehicle 102*b* is reconnected to the infrastructure 104 the vehicle 102*b* can be guided by the infrastructure server 104 to travel at an increased speed relative to the constant speed. As an example, in the instance wherein the vehicle 102*b* is reconnected to the infrastructure 104 the vehicle 102*b* can be guided by the infrastructure server 104 to travel at an increased speed relative to the constant speed so that lost time may be recovered in the instance wherein the vehicle 102*b* may have slowed down to a stop or may have deviated from the planned route. As an additional example, in the instance wherein the one or more signals are broadcasted (i.e., C-V2X PC5 signals), then vehicles 102*c* and 102*d* can simultaneously start moving in the instance wherein the vehicles 102*c* and 102*d* were stopped. For example, in the instance wherein the one or more signals are cellularly sent to each of the vehicles, for example unicasted, the vehicles 102*c* and 102*d* can be individually guided by the infrastructure server 104 to start moving in the instance wherein the vehicles 102*c* and 102*d* were stopped. As a further example, the vehicle 102*b* can be guided by the infrastructure server 104 to travel at an increased speed relative to the constant speed to catch up with the traveling speed of the vehicle 102*a*. It is understood that the vehicles 102*c* and 102*d* also increase speed relative to the constant speed to catch up with the traveling speed of the vehicles 102*a* and 102*b*.

Figure 7:
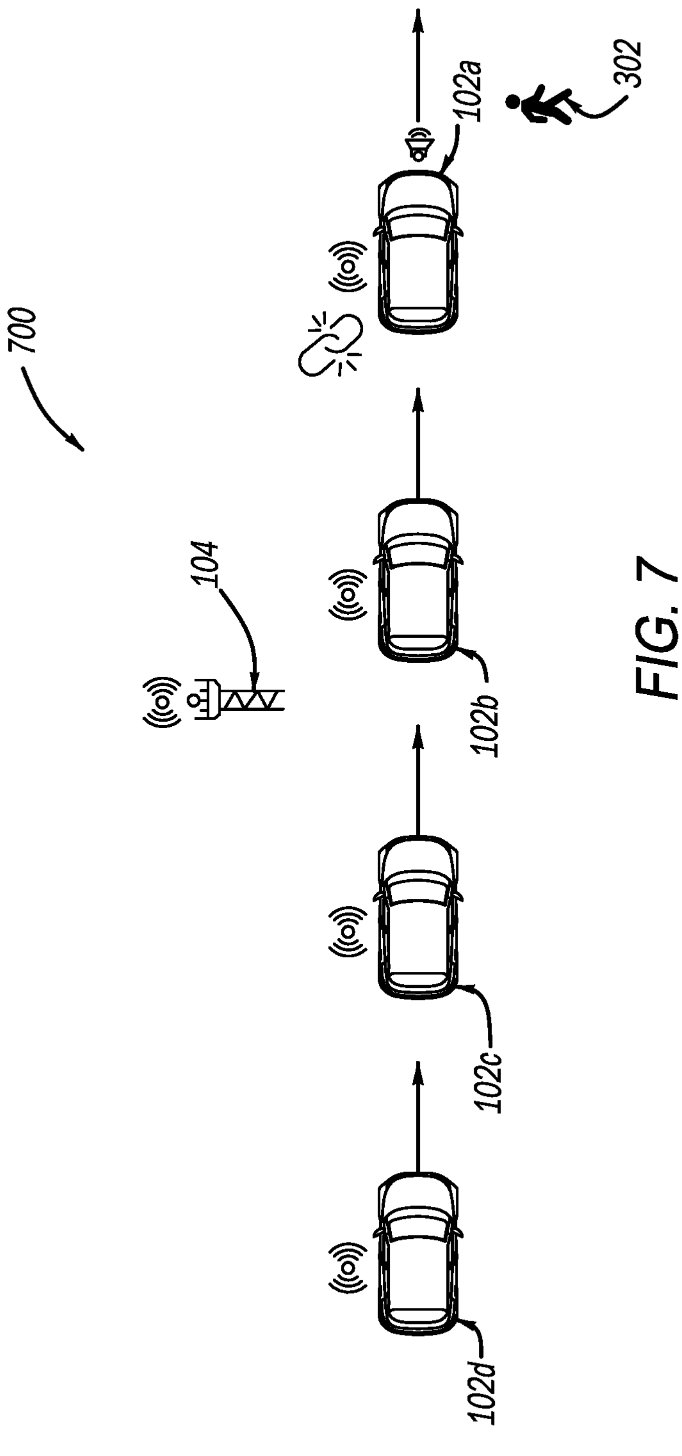
FIG. 7 illustrates a resolution of the present error of FIG. 6.

FIG. 7 illustrates a present error associated with a lead vehicle 102*a* of the fleet of marshaled vehicles 102 in a guided route 700. For example, in the event wherein the lead vehicle 102*a* loses connection with the infrastructure server 104, one or more panel excitors associated with the vehicle 102*a* issues an audio alert indicating a disconnection between the vehicle 102*a* and the infrastructure server 104. The one or more panel excitors associated with the vehicle 102*a* also issues an audio alert indicating a reconnection between the vehicle 102*a* and the infrastructure server 104. It is understood that the one or more panel excitors associated with the vehicle 102*a* may also issue an audio alert regarding any indication of the connectivity status of the vehicle 102 at any time. For example, in response to the lead vehicle 102*a* losing connection with the infrastructure server 104, the subsequent vehicles (e.g., the vehicle 102*b*-102*d*) are instructed to slow down to increase a distance gap between the lead vehicle 102*a* and the next vehicle 102*b*. As another example, in response to the lead vehicle 102*a* re-establishing connection with the infrastructure server 104, the subsequent vehicles (e.g., the vehicle 102*b*-102*d*) are instructed to speed up to decrease the distance gap between the lead vehicle 102*a* and the next vehicle 102*b*.

Figure 8:
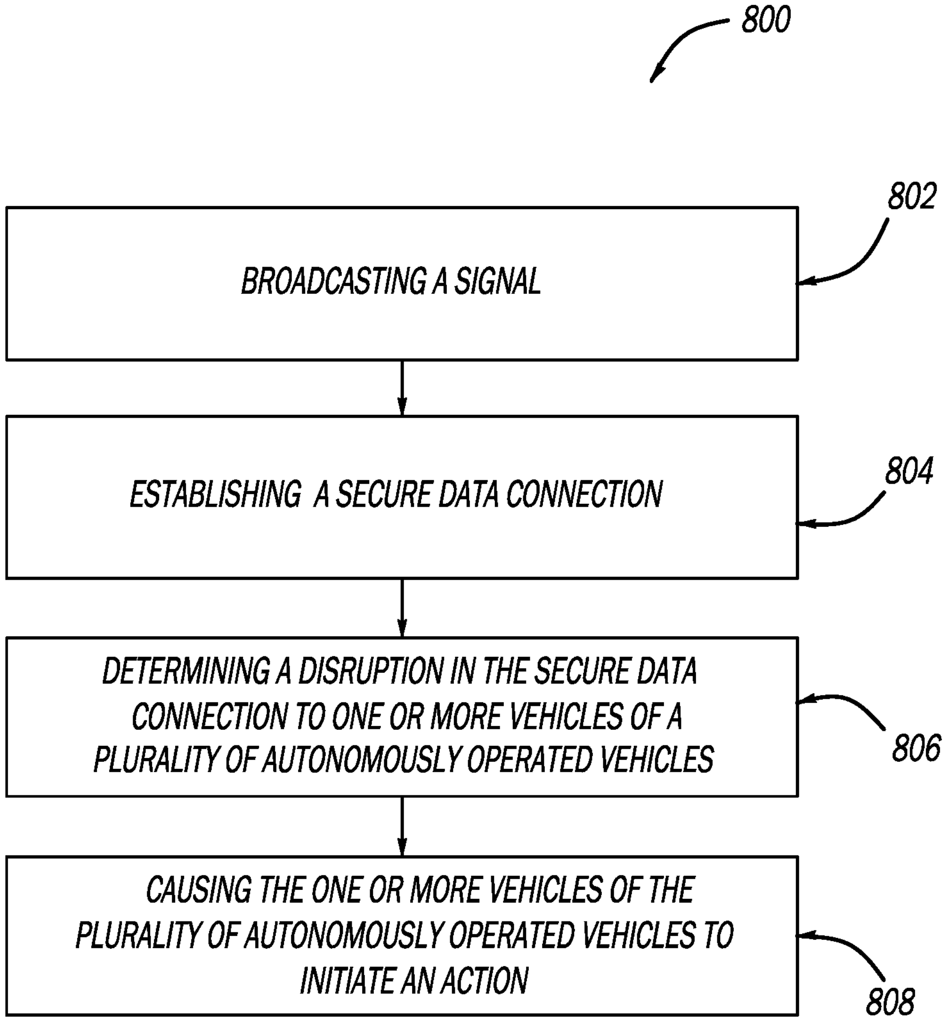
FIG. 8 is a flowchart illustrating an example method for adaptively responding to one or more marshaling failure modes in accordance with various implementations.

FIG. 8 is a flowchart illustrating another example method 800 of broadcasting a signal to marshal a plurality of autonomously operated vehicles (e.g., the vehicles 102). At step 802, a signal is broadcasted. It is understood that the signal can be one or more instructions or any other data-related transmission. For example, the signal is broadcasted to the plurality of autonomously operated vehicles. As a further example, the signal is broadcasted from an infrastructure server (e.g., the infrastructure server 104). As an additional example, the signal is associated with one or more commands that guide the plurality of autonomously operated vehicles to a waypoint. For example, at least one of the plurality of autonomously operated vehicles is a host vehicle. As another example, the host vehicle implements a collision avoidance algorithm that is configured to estimate at least a position and orientation of each of the plurality of autonomously operated vehicles. For example, the host vehicle implements a collision avoidance algorithm that is also configured to determine whether the broadcasted signal matches received information associated with the guidance of the autonomously operated vehicles to the waypoint. As another example, the determination of whether the broadcasted signal matches the received information is made by the host vehicle. The determination of whether the broadcasted signal matches the received information can be performed using any comparison process, such as to determine whether the information in the broadcasted signal is the same as the information associated with the guidance of the autonomously operated vehicles. It should be noted that any information can be used to determine the matching (and performing the comparison), such as any information relating to the guidance operations or progress of the autonomously operated vehicles.

As an additional example, the host vehicle implements a collision avoidance algorithm that estimates at least a position and orientation of each of the plurality of autonomously operated vehicles based on one or more vehicle sensors associated with the host vehicle. For example, the host vehicle communicates a potential collision to each of the plurality of autonomously operated vehicles. As another example, the host vehicle communicates a potential collision to each of the plurality of autonomously operated vehicles based on sensor data from the one or more vehicle sensors. As an additional example, the host vehicle communicates a potential collision to each of the plurality of autonomously operated vehicles further based on the received information not matching the broadcasted signal. That is, in some examples, the potential collision is based at least in part on the comparison or matching performed as described herein.

At step 804, a secure data connection is established. For example, the secure data connection is established with each of the plurality of autonomously operated vehicles. As another example, the secure data connection is established with each of the plurality of autonomously operated vehicles based on the signal. As a further example, the secure data connection is established in response to the broadcasted signal.

At step 806, a disruption in the secure data connection to one or more vehicles of the plurality of autonomously operated vehicles is determined (e.g., identified or detected). For example, the disruption in the secure data connection is determined based on one or more of: a loss of one or more data packets between the one or more vehicles and a server; a server sensing error; human takeover of control of the one or more vehicles and an unscheduled deviation from a planned route based on a minimum displacement that is exceeded for a predetermined interval; malicious control of software associated with the one or more vehicles; or pedestrians or another vehicle within a proximity of a path zone of the one or more vehicles at an unscheduled time. As another example, whether the disruption in the secure data connection exceeds a threshold of time or a threshold amount of lost data packets that are lost is determined.

At step 808, the one or more vehicles of the plurality of autonomously operated vehicles are caused to initiate an action. For example, the one or more vehicles of the plurality of autonomously operated vehicles are caused to initiate an action based on the disruption in the secure data connection. As another example, the one or more vehicles of the plurality of autonomously operated vehicles are caused to maintain the secure data connection to decelerate. For example, the one or more vehicles are caused to maintain the secure data connection to decelerate, thereby causing the one or more vehicles that have maintained the secure data connection to increase a safety gap between each of the plurality of autonomously operated vehicles. As another example, the one or more vehicles that have maintained the secure data connection are behind the one or more vehicles having the disruption in the secure data connection. For example, the one or more vehicles are caused to maneuver away from the plurality of autonomously operated vehicles. As another example, the one or more vehicles are caused to maneuver away from the plurality of autonomously operated vehicles based on the disruption in the secure data connection exceeding the threshold of time or the threshold amount of lost data packets. As a further example, the one or more vehicles are caused to output an exterior alarm. For example, the one or more vehicles are caused to output the exterior alarm based on one or more instructions and the disruption in the secure data connection exceeding the threshold of time or the threshold amount of lost data packets. As another example, the exterior alarm is an emitted sound, a pattern of flashing lights, or a combination thereof.

In an embodiment, one or more vehicles that maintain the secure data connection are caused to accelerate. For example, the one or more vehicles that maintain the secure data connection are caused to accelerate based on the broadcasted one or more commands and/or a restoration of the secure data connection. As another example, the one or more vehicles that maintain the secure data connection are caused to accelerate, thereby causing the one or more vehicles that have maintained the secure data connection to decrease a safety gap between each of the plurality of autonomously operated vehicles. As an additional example, the one or more vehicles that have maintained the secure data connection are behind the one or more vehicles having the disruption in the secure data connection.

Figure 9:
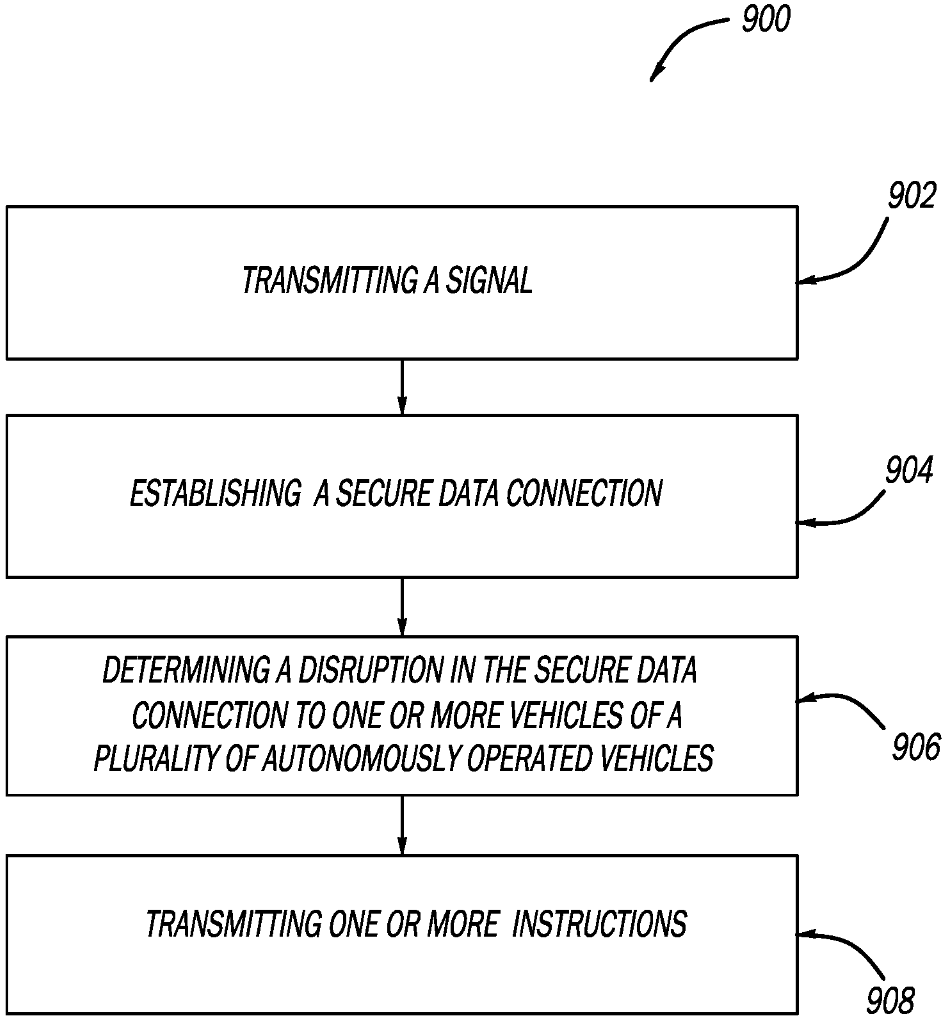
FIG. 9 is a flowchart illustrating another example method for adaptively responding to one or more marshaling failure modes in accordance with various implementations.

FIG. 9 is a flowchart illustrating another example method 900 of individually transmitting a signal to marshal each vehicle of a plurality of autonomously operated vehicles (e.g., the vehicles 102). At step 902, a signal is transmitted. It is understood that the signal can be one or more instructions or any other data-related transmission. For example, the signal is transmitted to each of the plurality of autonomously operated vehicles. As another example, the signal is associated with respective vehicles of the plurality of autonomously operated vehicles and/or one or more commands that guide each of the autonomously operated vehicles to a waypoint.

At step 904, a secure data connection is established. For example, the secure data connection is established with each of the plurality of autonomously operated vehicles based on the signal. As another example, the secure data connection is established in response to the transmitted signal.

At step 906, a disruption in the secure data connection to one or more vehicles of the plurality of autonomously operated vehicles is determined. For example, the disruption in the secure data connection is determined based on one or more of: a loss of one or more data packets between the one or more vehicles and a server; a server sensing error; human takeover of the one or more vehicles and an unscheduled deviation from a planned route based on a minimum displacement that is exceeded for a predetermined interval; malicious control of software associated with the one or more vehicles; or pedestrians or another vehicle within a proximity of a path zone of the one or more vehicles at an unscheduled time. As another example, the whether the disruption in the secure data connection exceeds a threshold of time or a threshold amount of lost data packets that are lost is determined.

At step 908, one or more instructions are transmitted. For example, the one or more instructions are transmitted based on the disruption in the secure data connection to the one or more vehicles of the plurality of autonomously operated vehicles. As another example, the one or more instructions cause the one or more vehicles to initiate an action.

In an embodiment, one or more vehicles that maintain the secure data connection and behind the one or more vehicles having the disruption in the secure data connection are caused to decelerate. For example, the one or more vehicles that maintain the secure data connection and behind the one or more vehicles having the disruption in the secure data connection are caused to decelerate based on the one or more instructions and/or the disruption in the secure data connection. As another example, the one or more vehicles that maintain the secure data connection and behind the one or more vehicles having the disruption in the secure data connection are caused to decelerate, thereby causing the one or more vehicles having the maintained secure data connection to increase a safety gap between each of the plurality of autonomously operated vehicles.

In another embodiment, the one or more vehicles that maintain the secure data connection and behind the one or more vehicles having the disruption in the secure data connection are caused to accelerate. For example, the one or more vehicles that maintain the secure data connection and behind the one or more vehicles having the disruption in the secure data connection are caused to accelerate based on the transmitted one or more instructions and a restoration of the secure data connection. As another example, the one or more vehicles that maintain the secure data connection and behind the one or more vehicles having the disruption in the secure data connection are caused to accelerate, thereby causing the one or more vehicles having maintained secure data connection to decrease a safety gap between each of the plurality of autonomously operated vehicles.

In yet another embodiment, the one or more vehicles are caused to maneuver away from the plurality of autonomously operated vehicles. For example, the one or more vehicles are caused to maneuver away from the plurality of autonomously operated vehicles based on the one or more instructions and/or the disruption in the secure data connection exceeding the threshold of time or the threshold amount of lost data packets. As another example, the one or more vehicles are caused to output an exterior alarm. For example, the one or more vehicles are caused to output an exterior alarm based on the one or more instructions and/or the disruption in the secure data connection exceeding the threshold of time or the threshold amount of lost data packets. As an additional example, the exterior alarm is an emitted sound, a pattern of flashing lights, or a combination thereof.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of broadcasting a signal to marshal a plurality of autonomously operated vehicles, the method comprising:

broadcasting, from an infrastructure server to the plurality of autonomously operated vehicles, the signal, wherein the signal is associated with one or more commands that guide the plurality of autonomously operated vehicles to a waypoint and wherein at least one vehicle of the plurality of autonomously operated vehicles is a host vehicle that implements a collision avoidance algorithm configured to determine that the broadcasted signal matches received information;

establishing, with each of the plurality of autonomously operated vehicles based on the signal, a secure data connection;

detecting a disruption in the secure data connection with at least one vehicle of the plurality of autonomously operated vehicles; and causing one or more vehicles of the plurality of autonomously operated vehicles that maintain the secure data connection to initiate an action in response to detecting the disruption in the secure data connection with the at least one vehicle of the plurality of autonomously operated vehicles including, in response to the received information not matching the broadcasted signal, the host vehicle communicates a potential issue to each of the plurality of autonomously operated vehicles.

2. The method of claim 1, collision avoidance algorithm is configured to:

estimate at least a position and orientation of each of the plurality of autonomously operated vehicles based on one or more vehicle sensors associated with the host vehicle; and determine that the broadcasted signal matches the received information, by the host vehicle, associated with the guidance of the autonomously operated vehicles to the waypoint.

3. The method of claim 2, wherein the potential issue comprises a potential collision and the host vehicle communicates the potential collision to each of the plurality of autonomously operated vehicles based on sensor data from the one or more vehicle sensors and further based on the received information not matching the broadcasted signal corresponding to a mismatch of waypoint information.

4. The method of claim 1, wherein the disruption in the secure data connection is determined based on one or more of: a loss of one or more data packets between the one or more vehicles and the infrastructure server; an infrastructure server sensing error; human takeover of the one or more vehicles and an unscheduled deviation from a planned route based on a minimum displacement that is exceeded for a predetermined interval; malicious control of software associated with the one or more vehicles; or pedestrians or another vehicle within a proximity of a path zone of the one or more vehicles at an unscheduled time.

5. The method of claim 1, wherein causing the one or more vehicles of the plurality of autonomously operated vehicles to initiate the action further comprises:

causing, based on the one or more commands and the disruption in the secure data connection, the one or more vehicles of the plurality of autonomously operated vehicles that maintain the secure data connection to decelerate, thereby causing the one or more vehicles that have maintained the secure data connection to increase a safety gap between each of the plurality of autonomously operated vehicles, wherein the one or more vehicles that have maintained the secure data connection are behind the at least one vehicle having the disruption in the secure data connection.

6. The method of claim 1, further comprising:

causing, based on the broadcasted one or more commands and a restoration of the secure data connection, the one or more vehicles that maintain the secure data connection to accelerate, thereby causing the one or more vehicles that have maintained the secure data connection to decrease a safety gap between each of the plurality of autonomously operated vehicles, wherein the one or more vehicles that have maintained the secure data connection are behind the at least one vehicle having the disruption in the secure data connection.

7. The method of claim 1, wherein determining the disruption in the secure data connection further comprises:

determining that the disruption in the secure data connection exceeds a threshold of time or a threshold amount of lost data packets that are lost.

8. The method of claim 7, wherein causing the one or more vehicles of the plurality of autonomously operated vehicles to initiate the action further comprises:

causing, based on the disruption in the secure data connection exceeding the threshold of time or the threshold amount of lost data packets, the one or more vehicles to maneuver away from other vehicles in the plurality of autonomously operated vehicles; or causing, based on one or more instructions and the disruption in the secure data connection exceeding the threshold of time or the threshold amount of lost data packets, the one or more vehicles to output an exterior alarm, wherein the exterior alarm is an emitted sound, a pattern of flashing lights, or a combination thereof.

9. A method of individually transmitting a signal to marshal each vehicle of a plurality of autonomously operated vehicles, the method comprising:

transmitting, from an infrastructure server to each of the plurality of autonomously operated vehicles, the signal, wherein the signal is associated with respective vehicles of the plurality of autonomously operated vehicles and one or more commands that guide each of the autonomously operated vehicles to a waypoint and wherein at least one vehicle of the plurality of autonomously operated vehicles is a host vehicle that implements a collision avoidance algorithm configured to determine that the transmitted signal matches received information;

establishing, with each of the plurality of autonomously operated vehicles based on the signal, a secure data connection;

detecting a disruption in the secure data connection to one or more vehicles with at least one vehicle of the plurality of autonomously operated vehicles; and transmitting to one or more vehicles of the plurality of autonomously operated vehicles that maintain the secure data connection, one or more instructions, wherein the one or more instructions cause the one or more vehicles to initiate an action in response to detecting the disruption in the secure data connection with the at least one vehicle of the plurality of autonomously operated vehicles including, in response to the received information not matching the transmitted signal, the host vehicle communicates a potential issue to each of the plurality of autonomously operated vehicles.

10. The method of claim 9, wherein the disruption in the secure data connection is determined based on one or more of: a loss of one or more data packets between the one or more vehicles and the infrastructure server; an infrastructure server sensing error; human takeover of the one or more vehicles and an unscheduled deviation from a planned route based on a minimum displacement that is exceeded for a predetermined interval; malicious control of software associated with the one or more vehicles; or pedestrians or another vehicle within a proximity of a path zone of the one or more vehicles at an unscheduled time.

11. The method of claim 9, further comprising:

causing, based on the one or more instructions and the disruption in the secure data connection, the one or more vehicles that maintain the secure data connection and behind the at least one vehicle having the disruption in the secure data connection to decelerate, thereby causing the one or more vehicles having the maintained secure data connection to increase a safety gap between each of the plurality of autonomously operated vehicles.

12. The method of claim 9, further comprising:

causing, based on the transmitted one or more instructions and a restoration of the secure data connection, the one or more vehicles that maintain the secure data connection and behind the at least one vehicle having the disruption in the secure data connection to accelerate, thereby causing the one or more vehicles having maintained secure data connection to decrease a safety gap between each of the plurality of autonomously operated vehicles.

13. The method of claim 9, wherein determining the disruption in the secure data connection further comprises:

determining that the disruption in the secure data connection exceeds a threshold of time or a threshold amount of lost data packets that are lost.

14. The method of claim 13, further comprising:

causing, based on the one or more instructions and the disruption in the secure data connection exceeding the threshold of time or the threshold amount of lost data packets, the one or more vehicles to maneuver away from other vehicles in the plurality of autonomously operated vehicles; or causing, based on the one or more instructions and the disruption in the secure data connection exceeding the threshold of time or the threshold amount of lost data packets, the one or more vehicles to output an exterior alarm, wherein the exterior alarm is an emitted sound, a pattern of flashing lights, or a combination thereof.

15. A system for marshaling a plurality of autonomously operated vehicles, the system comprising:

a server configured to:

broadcast, to the plurality of autonomously operated vehicles, a signal associated with one or more commands, wherein the one or more commands guide the plurality of autonomously operated vehicles to a waypoint and wherein at least one vehicle of the plurality of autonomously operated vehicles is a host vehicle that implements a collision avoidance algorithm configured to determine that the broadcasted signal matches received information, establish, with each of the plurality of autonomously operated vehicles based on the signal, a secure data connection, detect a disruption in the secure data connection with at least one vehicle of the plurality of autonomously operated vehicles, and cause one or more vehicles of the plurality of autonomously operated vehicles that maintain the secure data connection to initiate an action in response to detecting the disruption in the secure data connection with the at least one vehicle of the plurality of autonomously operated vehicles; and the plurality of autonomously operated vehicles configured to:

receive the one or more commands and in response to the received information not matching the broadcasted signal, the host vehicle communicates a potential issue to each of the plurality of autonomously operated vehicles, and initiate the action.

16. The system of claim 15, wherein the disruption in the secure data connection is determined based on one or more of: a loss of one or more data packets between the one or more vehicles and the server; a server sensing error;

human takeover of the one or more vehicles and an unscheduled deviation from a planned route based on a minimum displacement that is exceeded for a predetermined interval; malicious control of software associated with the one or more vehicles; or pedestrians or another vehicle within a proximity of a path zone of the one or more vehicles at an unscheduled time.

17. The system of claim 15, wherein the server configured to cause the one or more vehicles of the plurality of autonomously operated vehicles to initiate the action is further configured to:

cause, based on the one or more commands and the disruption in the secure data connection, the one or more vehicles of the plurality of autonomously operated vehicles that maintain the secure data connection and behind the at least one vehicle having the disruption in the secure data connection to decelerate, thereby causing the one or more vehicles having the maintained secure data connection to increase a safety gap between each of the plurality of autonomously operated vehicles.

18. The system of claim 15, wherein the server configured to cause the one or more vehicles of the plurality of autonomously operated vehicles to initiate the action is further configured to:

cause, based on the broadcasted one or more commands and a restoration of the secure data connection, the one or more vehicles of the plurality of autonomously operated vehicles that maintain the secure data connection and behind the at least one vehicle having the disruption in the secure data connection to accelerate, thereby causing the one or more vehicles having the maintained secure data connection to decrease a safety gap between each of the plurality of autonomously operated vehicles.

19. The system of claim 15, wherein the server configured to determine the disruption in the secure data connection is further configured to:

determine that the disruption in the secure data connection exceeds a threshold of time or a threshold amount of lost data packets that are lost.

20. The system of claim 19, wherein the server configured to cause the one or more vehicles of the plurality of autonomously operated vehicles to initiate the action is further configured to:

cause, based on the disruption in the secure data connection exceeding the threshold of time or the threshold amount of lost data packets, the one or more vehicles to maneuver away from other vehicles in the plurality of autonomously operated vehicles; or cause, based on one or more instructions and the disruption in the secure data connection exceeding the threshold of time or the threshold amount of lost data packets, the one or more vehicles to output an exterior alarm, wherein the exterior alarm is an emitted sound, a pattern of flashing lights, or a combination thereof.

* * * * *